United States Patent Office 3,597,480
Patented Aug. 3, 1971

3,597,480
(N-TRIHALOMETHYLTHIO-N-TRIFLUORO-
METHYL-AMINO)-BENZAMIDES
Hans Scheinpflug, Leverkusen, Engelbert Kuhle, Bergisch
Gladbach, Erich Klauke, Cologne-Flittard, Paul-Ernst
Frohberger, Leverkusen, and Ferdinand Grewe, Bur-
scheid, Germany, assignors to Farbenfabriken Bayer
Aktiengesellschaft, Leverkusen, Germany
No Drawing. Continuation-in-part of application Ser. No.
666,918, Sept. 11, 1967. This application Feb. 10, 1970,
Ser. No. 10,299
Claims priority, application Germany, Sept. 15, 1966,
F 50,206
Int. Cl. C07c 103/32
U.S. Cl. 260—558       15 Claims

ABSTRACT OF THE DISCLOSURE (N - trihalomethylthio-N-trifluoromethyl-amino)-benz-amides which possess fungicidal properties and which may be produced by reacting the corresponding fluoro-carbonyl - N - trihalomethylthio - N - trifluoromethyl-anilines, in the presence of an acid-binding agent, with amines.

---

This is a continuation-in-part of copending U.S. application Ser. No. 666,918, filed Sept. 11, 1967, now abandoned.

The present invention relates to and has for its objects the provision for particular new (N-trihalomethylthio-N-trifluoromethyl-amino)-benzamides which possess fungicidal properties, active compositions in the form of mixtures of such compounds with solid and liquid dispersible carrier vehicles, and methods for producing such compounds and for using such compounds in a new way especially for combatting fungi, e.g. in plant protection endeavors, with other and further objects becoming apparent from a study of the within specification and accompanying examples.

It is known that N-trichloromethylmercaptocyclohex-4-ene-1,2-dicarboximide (A) can be used as a fungicide in plant protection. This compound is used as an organic, synthetic fungicidally active compound for the control of fungoid diseases in cereals such as rice, since organo-mercury compounds are generally avoided because of their high toxicity to warm-blooded animals.

It has been found in accordance with the present invention that the particular new (N-trihalomethylthio-N-trifluoromethyl-amino)-benzamides having the formula

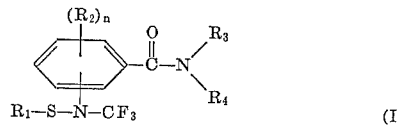

in which $n$ is a whole number from 0 to 3, $R_1$ is trihalomethyl, $R_2$ is selected from the group consisting of halo, lower alkyl, lower alkoxy, trifluoromethyl, and mixtures thereof when $n$ is 2–3, $R_3$ is selected from the group consisting of hydrogen, lower alkyl and lower alkenyl, and $R_4$ is selected from the group consisting of hydrogen, alkyl, alkenyl, cycloalkyl, phenyl, substituted phenyl which is substituted with 1–3 substituents selected from the group consisting of halo, nitro, lower alkyl, lower alkoxy and mixtures of such substituents, and hydroxylower alkyl, exhibit strong fungicidal properties, especially against phytopathogenic fungi.

It has been furthermore found in accordance with the present invention that a versatile and smooth process for the production of the particular new (N-trihalomethyl-thio-N-trifluoromethyl-amino)-benzamides of Formula I above in favorable yields may be provided, which comprises reacting fluorocarbonyl-N-trihalomethylthio-N-trifluoromethyl-anilines having the formula

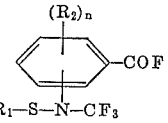

in which $R_1$, $R_2$, and $n$ are the same as defined above, with amines having the formula

in which $R_3$ and $R_4$ are the same as defined above, in the presence of an acid-binding agent.

The fluorocarbonyl - N - trihalomethylthio-N-trifluoromethyl-anilines used as starting compounds herein may be prepared by reaction of the corresponding fluorocarbonyl-N-trifluoromethyl-arylamines with sulfonic acid chlorides in the presence of a tertiary base as acid acceptor (cf. for example Ser. No. 624,981).

The reaction temperatures usable for the reaction of compounds of Formula IIa with compounds of Formula IIb can be varied within a fairly wide range; preferably the work is carried out at substantially between about 10 to 50° C. As solvents or diluents, there are suitable, besides water, inert organic solvents such as benzene, chlorobenzene, dioxan, acetone, and the like.

In order to bind the hydrogen fluoride liberated during the reaction, a tertiary base or alkali metal hydroxide, or the like, is added. Expediently, however, there is used double the amount of the amine required for the reaction, so that the excess amine acts as acid-binding agent.

Suitable active compounds according to the present invention include 2-, 3- or 4-(N-dichlorofluoromethylthio-N - trifluoromethyl-amino)-benzoic acid-amide, -methylamide, -allylamide, -butylamide, -dodecylamide, -dimethylamide, methylbutylamide, diisobutylamide, cyclohexylamide, anilide, -p-chloroanilide, -2′,4′-dichloroanilide, -m-nitroanilide, -o-toluide, -p-anisidide; 2-(N-trichloromethyl-thio-N-trifluoromethylamino)-benzoic acid butylamide; 3 - (N - bromochlorofluoromethylthio-N-trifluoromethyl-amino)-benzoic acid dimethylamide, and the like.

Advantageously, the particular new active compounds of the present invention exhibit a strong fungitoxic activity against phytopathogneic fungi. Their good compatibility with respect to warm-blooded animals and higher plants allows the use of the instant compounds as plant protection agents against fungoid diseases. It should be noted that the instant compounds do not normally damage cultivated plants in the concentrations necessary for the control of fungi. The instant compounds are particularly usable as fungitoxic agents in plant protection such as for the control of various fungi, for example of different classes of fungi, including Archimycetes, Phycomycetes, Ascomycetes, Basidiomycetes, Fungi imperfecti, and the like.

The particular new active compounds of the present invention have a very wide spectrum of activity. Such compounds can be used therefore against parasitic fungi on above-the-ground portions of plants, fungi causing tracheomycosis, which attack the plant from the soil, seed-borne fungi and fungi which inhabit the soil.

Specifically, such active compounds according to the present invention have for example proved effective against *Phytophthora infestans, Plasmopara viticola, Venturia inaequalis, Podosphaera leucotricha, Cochliobolus miyabeanus, Mycosphaerella musicola, Cercospora personata, Botrytis Cinerea,* Alternaria species, *Piricularia oryzae,* and the like.

The instant active compounds have exhibited particularly good results in the control of rice diseases. Thus such compounds show an excellent activity against the fungi *Piricularia oryzae* and *Pellicularia sasakii*, so that they can be used for the joint control of these two fungoid diseases. This represents a substantial technical advance in the art, since hitherto agents from different chemical groups had to be used against these two fungi. Surprisingly, the instant active compounds show not only a protective action, but also a curative effect, for example against *Ventruria inaequalis*.

Likewise highly effective and of particular practical importance are the instant active compounds when used an seed dressing agents or soil treatment agents against phytopathogenic fungi which adhere to the seed or occur in the soil and cause, in cultivated plants, seedling diseases, root rot tracheomycoses, and diseases of the stalk, blade, leaf, blossom, fruit or seed, such as *Tilletia caries, Helminthosporium gramineum, Fusarium nivale, Fusarium culmorum, Rhizoctonia solani, Phialophora cinerescens, Verticilium alboatrum, Fusarium dianthi, Fusarium cubense, Fusarium oxysporum, Fusarium solani, Sclerotinia sclerotiorum, Theielaviopsis basicola, Phytophthora cactorum*, and the like.

The particular active compounds according to the instant invention can be utilized, if desired, in the form of the usual formulations or compositions with diluents or extenders, i.e., dispersible carrier vehicles, such as solutions, emulsions, suspensions, emulsifiable concentrates, spray powders, pastes, soluble powders, dusting agents, granulates, etc. These are prepared in known manner, for instance by extending the active compounds with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38. The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), amines (for instance, ethanolamine, etc.), ethers, ether-alcohols (for instance, glycol monomethyl ether, etc., amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be employed alone or in the form of mixtures with one another and/or with such solid or liquid dispersible carrier vehicles and/or with other known compatible active agents, especially plant protection agent, such as other fungicides, herbicides, insecticides, bactericides, nematocides, protective substances which protect against damage by birds, growth promoters, plant nutrients, soil structure improving agents, etc., if desired, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.0005–0.5%, preferably 0.001–0.2%, by weight of the mixture, especially when used at leaf fungicides. Thus, the present invention contemplates over-all compositions which comprise mixtures of a dispersible carrier vehicle such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally about 0.0005–95%, and preferably 0.001–95%, by weight of the mixture.

In the case of seed treatment, i.e., seed dressing, in general, there are used amounts of the particular active compound between about 0.1–10 g., preferably 0.5–5 g., per kg. of seed. For the treatment of soil, amounts of the given active compound of between about 1–500 g., preferably 10–200 g., per cubic meter of soil are generally necessary.

Furthermore, the present invention contemplates methods of selectively controlling or combatting fungi, which comprises applying to at least one of (a) such fungi and (b) their habitat, a fungicidally effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, squirting, dressing, encrustation, and the like.

It will be realized, of course, that the concentration of the particular active compound utilized in admixture with the carrier vehicle will depend upon the intended application. Therefore, in special cases, it is possible to go above or below the aforementioned concenertation ranges.

The following examples are set forth by way of illustration and not limitation of the manner of using the particular active compounds of the present invention.

EXAMPLE 1

Piricularia test: liquid preparation of active compound
Pellicculara test: liquid preparation of active compound
Solvent: 1 part by weight acetone
Dispersing agent: 0.05 part by weight sodium oleate
Other additives: 0.2 part by weight gelatin
Water: 98.75 parts by weight H$_2$O The amount of the particular active compound required for the desired concentration of such active compound in the spray liquor is mixed with the stated amount of solvent, and the resulting concentrate is diluted with the stated amount of water containing the stated amounts of dispersing agent and gellatin.

2 batches of 30 rice plants about 2–4 weeks old are sprayed with the spray liquor until dripping wet. The plants remain in a greenhouse at temperatures of 22–24° C. and a relative atmospheric humidity of about 70% until they are dry. One batch of the plants is then inoculated with an aqueous suspension of 100,000 to 200,000 spores/ml. of *Piricularia oryzae* and placed in a chamber at 24–26° C. and 100% relative atmospheric humidity. The other batch of plants is infected with a culture of *Pellicularia sasakii* grown on malt agar and kept at 28–30° C. and 100% relative atmospheric humidity.

5-8 days after inoculation, the infestation of all the leaves present at the time of inoculation with *Piricularia* is determined as a percentage of the untreated but also inoculated control plants. In the case of the plants infected with *Pellicularia sasakii* the infestation is, after the same time, determined on the leaf sheaths, likewise in proportion to the untreated but infected control plants. 0% means no infestation; 100% means that the infestation is exactly as great in the case of the control plants.

The particular active compounds, the concentrations of such active compounds and the results obtained can be seen from the following Table I:

TABLE 1

Piricularia test } Liquid preparation of
Pellicularia test } active compound.

| Active compound | | Infestation as a percentage of the infestation of the untreated control with a concentration of active compound (in percent) of— | |
|---|---|---|---|
| | | *Piricularia oryzae*, 0.05 | *Pellicularia sasakii*, 0.05 |
| (A) | 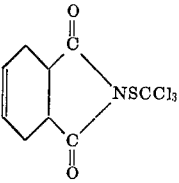 (known) | 16 | 100 |
| (III$_1$) | 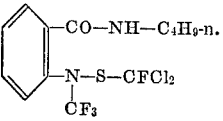 | 0 | |
| (IV$_1$) | 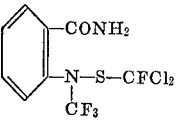 | 0 | |
| (V$_1$) | 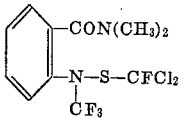 | 0 | |
| (VI$_1$) | 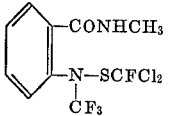 | 0 | |
| (VII$_1$) | 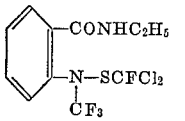 | 12 | |
| (VIII$_1$) | 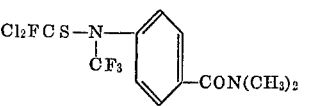 | 0 | |
| (IX$_1$) | 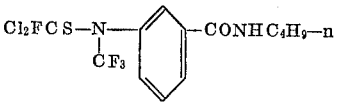 | 0 | 3 |
| (X$_1$) | 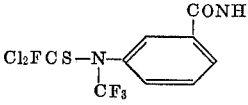 | 0 | 44 |
| (XI$_1$) | 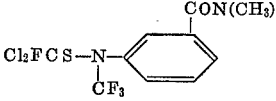 | 0 | |
| (XII$_1$) | 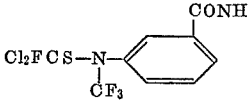 | 1 | 54 |

TABLE 1.—Continued

| Active compound | Infestation as a percentage of the infestation of the untreated control with a concentration of active compound (in percent) of— | |
|---|---|---|
| | Piricularia oryzae, 0.05 | Pellicularia sasaki 0.05 |
| (XIII₁) $CF_3-\phenyl(CONHC_4H_9\text{-}n)-N(SCFCl_2)(CF_3)$ | 0 | |
| (XIV₁) $CF_3-\phenyl(CON(CH_3)_2)-N(SCFCl_2)(CF_3)$ | 0 | |
| (XV₁) $CF_3-\phenyl(CONHC_2H_5)-N(SCFCl_2)(CF_3)$ | 0 | |
| (XVI₁) $(CH_3)_2NCO-\phenyl(CH_3)-N(SCFCl_2)(CF_3)$ | 0 | 25 |
| (XVII₁) $CH_3NHCO-\phenyl(CH_3)-N(SCFCl_2)(CF_3)$ | 0 | |
| (XVIII₁) $\phenyl(CH_3)(CON(CH_3)_2)-N(SCFCl_2)(CF_3)$ | | 4 |
| (XIX₁) $\phenyl(OCH_3)(CONHCH_3)-N(SCFCl_2)(CF_3)$ | | 38 |
| (XX₁) $\phenyl(CON(CH_3)-CH_2-CH_2OH)-N(SCFCl_2)(CF_3)$ | 0 | |
| (XXI₁) $\phenyl(CONHC_4H_9\text{-tert.})-N(SCFCl_2)(CF_3)$ | 0 | |
| (XXII₁) $\phenyl(Cl)(CONHCH_3)-N(SCFCl_2)(CF_3)$ | 0 | 0 |
| (XXIII₁) $\phenyl-CONH-\phenyl(H), -N(SCFCl_2)(CF_3)$ | 0 | |

EXAMPLE 2

Mycelium growth test

Nutrient medium used:                                  Parts
  Agar-agar (powdered) _____    20
  Malt extract _____    30
  Distilled H₂O _____    950
Proportion of solvent to nutrient medium:
  Acetone _____    2
  Agar nutrient medium _____    100

The amount of the particular active compound required for the desired concentration of such active compound in the nutrient medium is mixed with the stated amount of solvent. The resulting solvent preparation concentrate is thoroughly mixed, in the stated proportion, with the liquid nutrient medium (which has been cooled to 43° C.), and is then poured into Petri dishes of 9 cm. diameter. Control dishes of the nutrient medium to which the solvent preparation has not been added are also set up.

When the nutrient medium has cooled and solidified, the dishes are inoculated with the species of fungi stated in Table 2 and Table 2a and incubated at about 21° C. Evaluation is carried out after 4-10 days, depending upon the speed of growth of the fungi. When evaluation is carried out, the radial growth of the mycelium on the treated nutrient media is compared with the growth on the control nutrient media. In the evaluation, there is determined the lowest concentration at which the individual fungi are totally inhibited.

The particular active compounds and the lowest effective concentration in p.p.m. are stated in the following Table 2 and Table 2a:

TABLE 2.—MYCELIUM GROWTH TEST

| Active compound | Botrytis cinerea | Cochliobolus miyabeanus | Fusarium cubense | Fusarium dianthi | Alternaria tenuis | Pellicularia sasakii | Verticillium albo-atrum | Cercospora coffeicola | Phialophora cinerescens | Cercospora personata | Cercospora musae | Piricularia oryzae |
|---|---|---|---|---|---|---|---|---|---|---|---|---|
| A — ⟨CO–N–SCCl₃–CO⟩ (known) | 100 | 100 | 100 | 100 | 500 | 50 | 100 | 100 | 100 | 50 | 50 | 50 |
| (IV₂) — CONH₂, N–SCFCl₂, CF₃ | 50 | 50 | 100 | 100 | 100 | 50 | 50 | 50 | 50 | 50 | 50 | 10 |
| (V₂) — CON(CH₃)₂, N–SCFCl₂, CF₃ | 10 | 10 | 50 | 50 | 10 | 10 | 50 | 10 | 10 | 10 | 10 | 10 |
| (VI₂) — CONHCH₃, N–SCFCl₂, CF₃ | 100 | 100 | 100 | 100 | 100 | 100 | 50 | 50 | 50 | 50 | 50 | 50 |

TABLE 2a.—MYCELIUM GROWTH TEST

| Active compound | Botrytis cinerea | Cochliobolus miyabeanus | Fusarium oxysp.f. cubense | Fusarium oxysp.f. dianthi | Pellicularia sasakii | Verticillium albo-atrum | Cercospora coffeicola | Phialophora cinerescens | Cercospora personata | Mycosphaerella musicola | Piricularia oryzae | Alternaria tenuis |
|---|---|---|---|---|---|---|---|---|---|---|---|---|
| (XXIV₁) — Cl, N–SCFCl₂, CF₃, CON(CH₃)₂ | 10 | 10 | 10 | 10 | 10 | 10 | 10 | 10 | 10 | 10 | 10 | 10 |
| (VII₂) — CONHC₂H₅, N–SCFCl₂, CF₃ | 10 | 10 | 10 | 10 | 10 | 10 | 10 | 10 | 10 | 10 | 10 | 10 |

EXAMPLE 3

Podosphaera test (powdery mildew of apples) [Protective]

Solvent: 4.7 parts by weight acetone
Emulsifier: 0.3 parts by weight alkylaryl polyglycol ether
Water: 95.0 parts by weight The amount of the particular active compound required for the desired concentration of such active compound in the spray liquid is mixed with the stated amount of solvent, and the resulting concentrate is diluted with the stated amount of water which contains the stated amount of emulsifier.

Young apple seedlings in the 4–6 leaf stage are sprayed with the spray liquid until dripping wet. The plants remain in a greenhouse for 24 hours at 20° C. and at a relative atmospheric humidity of 70°. The plants are then inoculated by dusting with conidia of the apple powder mildew causative organism (*Podosphaera leucotricha* Salm) and placed in a greenhouse at a temperature of 21–23° C. and at a relative atmospheric humidity of about 70%.

Ten days after the inoculation, the infestation of the seedlings is determined as a percentage of the untreated but also inoculated control plants.

0% means no infestation; 100% means that the infestation is exactly as great as in the case of the control plants.

The particular active compounds, the concentrations of such active compounds and the results obtained can be seen from the following Table 3:

TABLE 3.—PODOSPHAERA TEST (protective)

| Active compound | Infestation as a percentage of the infestation of the untreated control with a cocentration of active compound (in percent) of 0.025 |
|---|---|
| (A) [structure: benzene fused dicarboximide N–SCCl₃] (known) | 100 |
| (VII₃) [structure: benzene with –CONHC₂H₅ and –N(CF₃)–SCFCl₂] | 9 |
| (XXV₁) [structure: benzene with –CONH–CH₂–CH=CH₂ and –N(CF₃)–SCFCl₂] | 16 |

EXAMPLE 4

Eusicladium test (apple scab) [curative]

Solvent: 4.7 parts by weight acetone
Emulsifier: 0.3 parts by weight alkylaryl polyglycol ether
Water: 95.0 parts by weight The amount of the particular active compound required for the desired concentration of such active compound in the spray liquid is mixed with the stated amount of solvent, and the resulting concentrate is diluted with the stated amount of water which contains the stated amount of emulsifier.

Young apple seedlings in the 4–6 leaf stage are inoculated with an aqueous conidium suspension of the apple scab causative organism *Fusicladium dentriticum* Fuckel, and incubated for 18 hours in a humidity chamber at 18–20° C. and at an atmospheric humidity of 100%. The plants are then placed in a greehouse where they dry.

After standing for a suitable period of time, the plants are sprayed dripping wet with the spray liquid prepared in the manner described above. The plants then are again placed in a greenhouse.

15 days after inoculation, the infestation of the apple seedlings is determined as a percentage of the untreated but also inoculated control plants.

0% means no infestation; 100% means that the infestation is exactly as great as in the case of the control plants.

The particular active compounds, the concentrations of such active compounds, the residence period between inoculation and spraying and the results obtained can be seen from the following Table 4:

TABLE 4.—FUSICLADIUM TEST (curative)

[Residence period, 42 hours]

| Active compound | Infestation as a percentage of the infestation of the untreated control with a concentration of active compound (in %) of— | |
|---|---|---|
| | 0.1 | 0.025 |
| (A) [structure: benzene fused dicarboximide N–SCCl₃] (known) | 100 | |
| (XXVI₁) [structure: Cl₂FCS–N(CF₃)–C₆H₄–CONH₂] | 0 | 25 |
| (XII₂) [structure: Cl₂FCS–N(CF₃)–C₆H₄–CONHCH₃] | 0 | 27 |

EXAMPLE 5

Fusicladium test (apple scab) [protective]

Solvent: 4.7 parts by weight acetone
Emulsifier: 0.3 parts by weight alkylaryl polyglycol ether
Water: 95.0 parts by weight The amount of the particular active compound required for the desired concentration of such active compound in the spray liquid is mixed with the stated amount of solvent, and the resulting concentrate is diluted with the stated amount of water which contains the stated amount of emulsifier.

Young apple seedlings in the 4–6 leaf stage are sprayed with the spray liquid until dripping wet. The plants remain in a greenhouse for 24 hours at 20° C. and at a relative atmospheric humidity of 70%. The plants are then inoculated with an aqueous conidium suspension of the apple scab causative organism (*Fusicladium dendriticum* Fuckel) and incubated for 18 hours in a humidity chamber at 18–20° C. and at a relative atmospheric humidity of 100%.

The plants are then again placed in a greenhouse for 14 days.

15 days after inoculation, the infestation of the seedlings is determined as a percentage of the untreated but also incubated control plants.

0% means no infestation; 100% means that the infestation is exactly as great as in the case of the control plants.

The particular active compounds, the concentrations of such active compounds and the results obtained can be seen from the following Table 5:

TABLE 5.—FUSICLADIUM TEST (protective)

| Active compound | | Infestation as a percentage of the infestation of the untreated control with a concentration of active compound (in percent) of— | | |
|---|---|---|---|---|
| | | 0.025 | 0.0062 | 0.0031 |
| (A) | [benzene ring with CO–N(SCCl₃)–CO] (known) | 7 | 15 | 20 |
| (III₂) | [phenyl–CO–NH–C₄H₉–n with N(SCFCl₂)(CF₃)] | 0 | 0 | 2 |
| (XXVI₂) | Cl₂FCSN(CF₃)–C₆H₄–CONH₂ | 0 | 11 | 30 |
| (XII₃) | Cl₂FCSN(CF₃)–C₆H₄–CONHCH₃ | 0 | 0 | 1 |
| (VII₁) | [phenyl–CONHC₂H₅ with N(SCFCl₂)(CF₃)] | ------- | 2 | 2 |

TABLE V.—Continued

| Active compound | | Infestation as a percentage of the infestation of the untreated control with a concentration of active compound (in percent) of— | | |
|---|---|---|---|---|
| | | 0.025 | 0.0062 | 0.0031 |
| (XXV₂) | [phenyl–CONH–CH₂–CH=CH₂ with N(SCFCl₂)(CF₃)] | ------- | 0 | 0 |

EXAMPLE 6

Seed dressing test [bunt of wheat] (seed-borne mycosis)

To produce a suitable dry dressing, the particular active compound is extended with a mixture of equal parts by weight of talc and kieselguhr to give a finely powdered mixture with the desired concentration of the active compound.

Wheat seed is contaminated with 5 g. of the chlamydospores of *Tilletia caries* per kg. of seed. To apply the dressing, the seed is shaken with the dressing in a closed glass flask. The seed, on moist loam under a cover of a layer of muslin and 2 cm. of moderately moist compost soil, is exposed to optimum germination conditions for the spores for 10 days at 10° C. in a refrigerator.

The germination of the spores on the wheat grains, each of which is contaminated with about 100,000 spores, is subsequently determined microscopically. The smaller number of spores which have germinated, the more effective is the given active compound.

The particular active compounds, the concentrations of such active compounds in the dressing, the amounts of dressing used and the percentage spore germination can be seen from the following Table 6:

TABLE 6.—SEED DRESSING TEST (BUNT OF WHEAT)

| Active compound | | Concentration of active compound in the dressing in percent by weight | Amount of dressing used, g./kg. seed | Spore germination in percent |
|---|---|---|---|---|
| Not dressed | | | | >10 |
| (A) | [benzene ring with CO–N(SCCl₃)–CO] (known) | 30 | 1 | 0.05 |
| (XXVI₃) | Cl₂FCSN(CF₃)–C₆H₄–CONH₂ | 1 | 1 | 0.05 |
| | | 3 | 1 | 0.000 |
| | | 10 | 1 | 0.000 |
| | | 30 | 1 | 0.000 |
| (XII₄) | Cl₂FCSN(CF₃)–C₆H₄–CONHCH₃ | 3 | 1 | 0.005 |
| | | 10 | 1 | 0.000 |
| | | 30 | 1 | 0.000 |
| (XXVII₁) | CF₃–C₆H₄–CONH–CH₂–CH=CH₂ with N(SCFCl₂)(CF₃) | 30 | 1 | 0.000 |
| (XXIV₂) | Cl–C₆H₄–N(SCFCl₂)(CF₃) with CON(CH₃)₂ | 30 | 1 | 0.000 |

TABLE 6.— SEED DRESSING TEST (BUNT OF WHEAT)—Continued

| Active compound | | Concentration of active compound in the dressing in percent by weight | Amount of dressing used, g./kg. seed | Spore germination in percent |
|---|---|---|---|---|
| (XVI₂) | 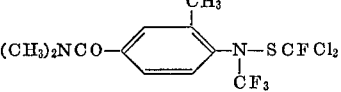 | 30 | 1 | 0.000 |
| (XVIII₂) | 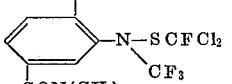 | 30 | 1 | 0.000 |
| (XIX₂) | 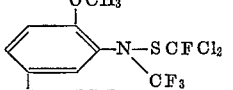 | 30 | 1 | 0.000 |
| (XXVIII₁) | 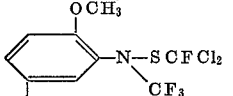 | 30 | 1 | 0.000 |

EXAMPLE 7

Soil treating agent test [soil-bornemycoses]

To produce a suitable preparation of the particular active compound, such active compound is extended with talc to a content of 5% and subsequently with quartz sand to a content of 0.5% of the active compound.

The preparation of the given active compound is uniformly mixed with Fruhstorfer standard soil, which has first been sterilized and then inoculated with pure cultures of the test fungi. The soil is filled into 5 pots, each of which is sown with 10 seeds of the host plant. The pots are placed in a greenhouse at the below stated temperatures and kept normally moist.

3 weeks after sowing, the number of healthy plants is determined as a percentage of the number of seeds sown. 0% means that no healthy plants have grown; 100% means that healthy plants have resulted from all the seeds.

The particular active compounds, the concentrations of such active compounds in the soil, the test fungi, host plant, greenhouse temperatures and the results obtained can be seen from the following Table 7:

TABLE 7.—SOIL TREATMENT AGENT TEST
[Soil-bornemycoses]

| Active compounds | | Concentration of active compound in milligram/litre soil | Number of healthy plants in percent | |
|---|---|---|---|---|
| | | | Test fungi | |
| | | | Rhizoct. solani | Fusarium culmorum |
| | | | Host plant | |
| | | | Peas | Peas |
| | | | Temperature range— | |
| | | | 18–22° C. | 22–25° C. |
| | Fruhstorfer standard soil sterilized untreated. | | 100 | 92 |
| | Fruhstorfer standard soil sterilized and inoculated untreated. | | 0 | 2 |
| (A) | 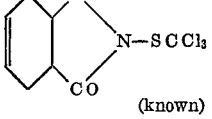 (known) | 100 | 24 | 0 |
| (IV₃) | 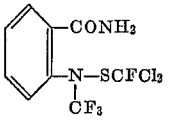 | 100 | 100 | |
| (V₃) | 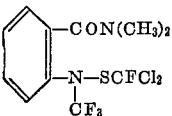 | 100 | 95 | |

TABLE 7.—Continued
[Soil-bornemycoses]

| Active compounds | Concentration of active compound in milligram/litre soil | Number of healthy plants in percent | |
|---|---|---|---|
| | | Test fungi | |
| | | Rhizoct. solani | culmorum Fusarium |
| | | Host plant | |
| | | Peas | Peas |
| | | Temperature range— | |
| | | 18–22° C. | 22–25° C. |
| (VI₃) 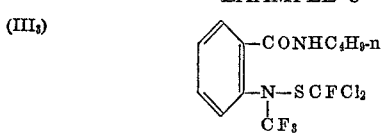 | 100 | 90 | |
| (XI₂) 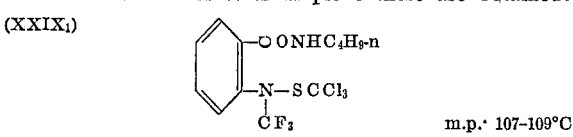 | 100 | 100 | 78 |
| (XIV₂) 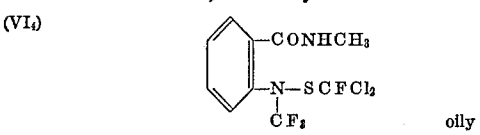 | { 50<br>{100 | 72<br>88 | |

The following further examples are set forth by way of illustration and not limitation of the manner of preparing the particular active compounds of the present invention.

EXAMPLE 8

(III₄) 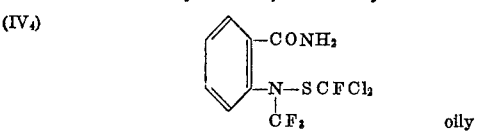

15 g. 2-fluorocarbonyl-N-dichlorofluoromethylthio-N-trifluoromethyl-aniline are dissolved in 100 ml. toluene, and 8 g. n-butylamine in 20 ml. toluene are added dropwise at room temperature. The temperature is allowed to rise to 50° C. The reaction solution is shaken out with water; this is followed by drying and concentration in a vacuum. The residue (17 g.) is recrystallized from white spirit to give 2-(N'-dichloromonofluoromethylthio-N'-trifluoromethyl-amino)-N - n-butyl-benzamide. M.P. 108–109° C.

EXAMPLE 9

In similar manner to Example 8 there are obtained:

(XXIX₁)

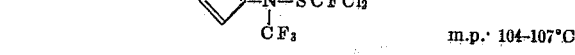 m.p.· 107–109°C 2-(N'-trichloromethylthio-N'-trifluoromethyl-amino)-N-n-butyl-benzamide (VI₄)

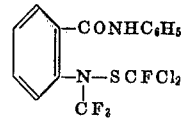 oily 2-(N'-dichloromonofluoromethylthio-N'-trifluoromethyl-amino)-N-methyl-benzamide (IV₄)

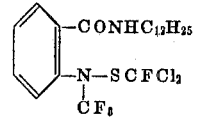 oily 2-(N-dichloromonofluoromethylthio-N-trifluoromethyl-amino)-benzamide (V₄)

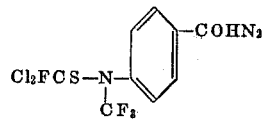 m.p.· 104–107°C 2-(N'-dichloromonofluoromethylthio-N'-trifluoromethyl-amino)-N,N-dimethyl-benzamide (XXX₁)

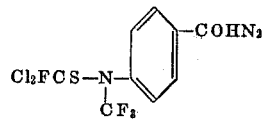 m.p.· 145–147°C 2-(N'-dichloromonofluoromethylthio-N'-trifluoromethyl-amino)-N-phenyl-benzamide (XXXI₁)

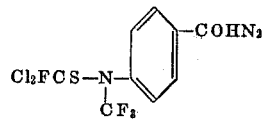 oily 2-(N'-dichloromonofluoromethylthio-N'-trifluoromethyl-amino)-N-dodecyl-benzamide

EXAMPLE 10

(XXVI₄)

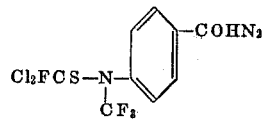

34 g. 4-fluorocarbonyl-N-dichlorofluoromethylthio-N-trifluoromethyl-aniline are dissolved in 100 ml. benzene, and 20 ml. of 25% aqueous ammonia are added at room temperature, with vigorous stirring. The temperature is allowed to rise to 30° C., the two layers are separated and the benzene layer is concentrated. After recrystallization from white spirit, the reaction product of M.P. 89–91° C. is obtained, i.e., 4-(N-dichloromonofluoromethylthio-N-trifluoromethyl-amino)-benzamide.

EXAMPLE 11

In similar manner to Example 10 there are obtained:

(VIII₂) 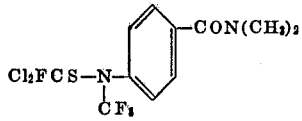 oily 4-(N'-dichloromonofluoromethylthio-N'-trifluoromethyl-amino)-N,N-dimethyl-benzamide (IX₂) 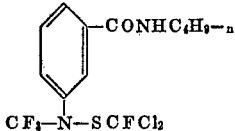 oily 3-(N'-dichloromonofluoromethylthio-N'-trifluoromethyl-amino)-N-n-butyl-benzamide (XXXII₁) 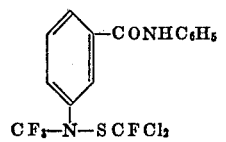 m.p.: 115–118° C.

3-(N'-dichloromonofluoromethylthio-N'-trifluoromethyl-amino)-N-phenyl-benzamide (XI₂) 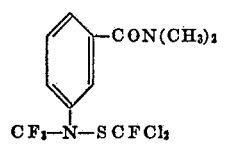 oily 3-(N'-dichloromonofluoromethylthio-N'-trifluoromethyl-amino)-N,N-dimethyl-benzamide (XXI₂) 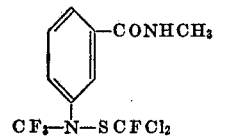 m.p.: 60° C.

3-(N'-dichloromonofluoromethylthio-N'-trifluoromethyl-amino)-N-methyl-benzamide

EXAMPLE 12

(XXXIII₁) 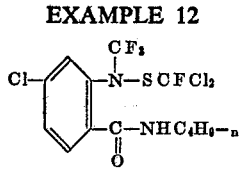

20 g. 2-fluorocarbonyl-5-chloro-N-dichlorofluoromethyl-thio-N-trifluoromethyl-aniline are dissolved in 100 ml. benzene, and 8 g. n-butylamine in 20 ml. benzene are added. The temperature rises to about 50° C. Filtering off cold with suction and concentration in a vacuum are effected. After recrystallization from white spirit, the reaction product melts at 72–76° C., i.e., 2-(N'-dichloro-monofluoromethylthio - N' - trifluoromethyl - amino) - 4 - chloro-N-n-butyl-benzamide.

EXAMPLE 13

In corresponding manner to Example 12 there are obtained:

(XXXIV₁) 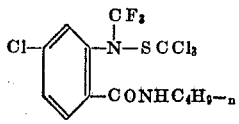 m.p.: 90–93° C.

2-(N'-trichloromethylthio-N'-trifluoromethyl-amino)-4-chloro-N-n-butyl-benzamide (XXXV₁) 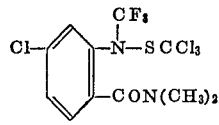 m.p.: 144–45° C.

2-(N'-trichloromethylthio-N'-trifluoromethyl-amino)-4-chloro-N,N-dimethyl-benzamide (XXXVI₁) 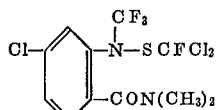 m.p.: 95° C.

2-(N'-dichloromonofluoromethylthio-N'-trifluoromethyl-amino)-4-chloro-N,N-dimethyl-benzamide

EXAMPLE 14

(XIII₂) 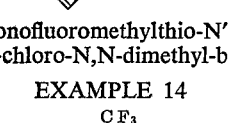

18 g. 2-fluorocarbonyl-4-trifluoromethyl-N-dichlorofluoromethylthio-N-trifluoromethyl-aniline are dissolved in 100 ml. benzene, and a solution of 6.5 g. n-butylamine in 200 ml. benzene is added. After completion of the reaction, shaking out with water is effected. From the benzene solution, after concentration, the reaction product is obtained as crystalline residue (21 g.) of M.P. 130° C., i.e., 2 - (N'-dichloromonofluoromethylthio-N'-trifluoromethyl-amino)-5-trifluoromethyl-N-n-butyl-benzamide.

EXAMPLE 15

According to the same method as Example 14 there are obtained:

(XIV₃) 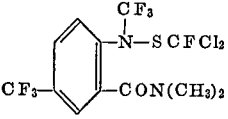 oily

2 - (N' - dichloromonofluoromethylthio-N'-trifluoromethyl-amino)-5-trifluoromethyl-N,N-dimethyl-benzamide (XXVII₂) 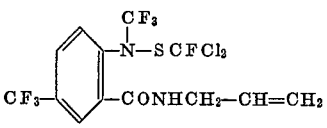 oily 2 - (N' - dichloromonofluoromethylthio-N'-trifluoromethyl-amino)-5-trifluoromethyl-N-α-allyl-benzamide

EXAMPLE 16

Using corresponding molar amounts of each of the following fluorocarbonyl-N-trihalomethylthio-N-trifluoromethyl-anilines with each of the following amines, respectively, in accordance with the procedure of Example 8, as the case may be:

(a) 2-fluorocarbonyl-3,4,5-trichloro-N-bromochloro-fluoromethylthio-N-trifluoromethyl-aniline and prop-2-enylamine;
(b) 5-fluorocarbonyl - 3 - fluoro - 2 - bromo-N-trifluoro-methylthio-N-trifluoromethyl-aniline and N-methyl-N-n-dodecyl-amine;
(c) 4-fluorocarbonyl-3-tert.-butyl-2-iodo-N-difluoromono-chloromethylthio-N-trifluoromethyl-aniline and N-meth-allyl-N-(3'-chloro-4'-nitro-5'-fluoro-phenyl-amine; and
(d) 6-fluorocarbonyl - 4 - ethoxy-3-isopropyl-2-trifluoro-methyl-N-chloroiodofluoromethylthio-N-trifluoro-methyl-aniline and N-isopropyl-N-(3'-isopropyl-4'-bromo-5'-ethoxy-phenyl)-amine;

the corresponding final compounds are produced:

(a') 6-(N'-bromochlorofluoromethylthio-N'-trifluoro-methylamino)-2,3,4-trichloro-N-prop-2-enyl-benzamide;

(b') 3-(N'-trifluoromethylthio-N'-trifluoromethyl-amino)-4-bromo-5-fluoro-N-vinyl-N-n-dodecyl-benzamide;

(c') 4 - (N' - difluoromonochloromethylthio-N'-trifluoromethylamino)-3-iodo-2-tert.-butyl-N-methallyl-N-(3'-chloro-4'-nitro-5'-fluoro-phenyl)-benzamide; and (d') 6 - (N' - chloroiodofluoromethylthio - N' - trifluoromethylamino)-5-trifluoromethyl-4-isopropyl-3-ethoxy-N-isopropyl-N-(3'-isopropyl-4'-bromo-5'-ethoxy-phenyl)-benzamide.

EXAMPLE 3A

The procedure of Example 3 is repeated and the following results are obtained:

TABLE 3A.—PODOSPHAERA TEST (PROTECTIVE)

| Active compound | | Infestation as a percentage of the infestation of the untreated control with a concentration of active compound (in percent) of— | |
|---|---|---|---|
| | | 0.025 | 0.0062 |
| (A) | 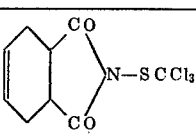 Known | 100 | |
| (XXXVII₁) | 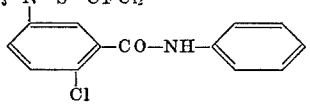 | 58 | |
| (XXXVIII₃) | 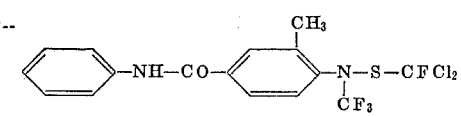 | 89 | |
| (XXXIX₁) | 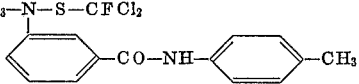 | 59 | |
| (XL₁) | 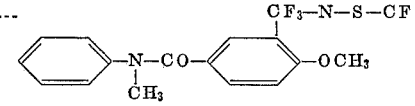 | 60 | |
| (XLI₁) | 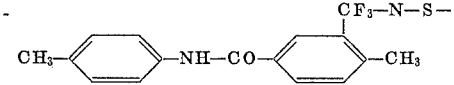 | 54 | |
| (XLII₁) | 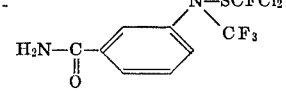 | 4 | 45 |
| (XLIII₁) | 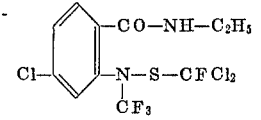 | 23 | 66 |
| (XLIV₁) | 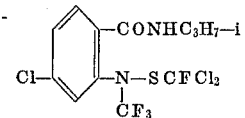 | 71 | |
| (XLV₁) | 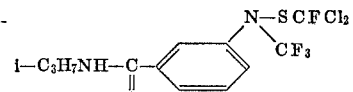 | 61 | |
| (XLVI₁) | 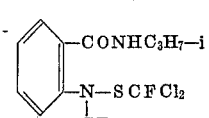 | 64 | |

EXAMPLE 4A

The procedure of Example 4 is repeated and the following results are obtained:

TABLE 4A.—FUSICLADIUM TEST (CURATIVE)

[Residence period, 42 hours]

| Active compound | | Infestation as a percentage of the infestation of the untreated control with a concentration of active compound (in percent) of— | |
|---|---|---|---|
| | | 0.1 | 0.025 |
| (A) | [cyclohexene-dicarboximide N—SCCl$_3$] | 100 | |
| (XXXVII$_2$) | CF$_3$—N—S—CFCl$_2$ on phenyl with Cl and CO—NH—phenyl | 80 | |
| (XLVII$_1$) | Cl-phenyl with CO—NH—phenyl and N(CF$_3$)—S—CFCl$_2$ | 73 | |
| (XLVIII$_1$) | phenyl-NHCO—(Cl-phenyl)—N(CF$_3$)—S—CFCl$_2$ | 72 | 1 |
| (XXXIX$_2$) | CF$_3$—N—S—CFCl$_2$ on phenyl with CO—NH—(4-CH$_3$-phenyl) | 86 | |
| (XL$_2$) | phenyl-N(CH$_3$)—CO—(OCH$_3$-phenyl)—N(CF$_3$)—S—CFCl$_2$ | 86 | |
| (XXII$_2$) | CH$_3$NH—CO—(4-Cl-phenyl)... N(CF$_3$)—SCFCl$_2$ | 70 | 79 |
| (XLII$_2$) | H$_2$N—CO—phenyl—N(CF$_3$)—SCFCl$_2$ | 12 | 23 |
| (XLIII$_2$) | Cl-phenyl with CO—NH—C$_2$H$_5$ and N(CF$_3$)—S—CFCl$_2$ | 74 | |
| (XLV$_2$) | i-C$_3$H$_7$NH—CO—phenyl—N(CF$_3$)—SCFCl$_2$ | 88 | |
| (XLVI$_2$) | phenyl-CONHC$_3$H$_7$-i, N(CF$_3$)—SCFCl$_2$ | 68 | |

EXAMPLE 5A

The procedure of Example 5 is repeated and the following results are obtained:

TABLE 5A.—FUSICALDIUM TEST (PROTECTIVE)

| Active compound | | Infestation [1] (in percent) of— | | |
|---|---|---|---|---|
| | | 0.025 | 0.0062 | 0.0031 |
| (A) | [structure: phthalimide with N–SCCl₃] Known | 7 | 15 | 20 |
| (XXII₃) | [structure: CH₃NH–CO–phenyl(Cl)(CF₃)–N–SCFCl₂] | 0 | 0 | |
| (XLII₃) | [structure: H₂N–CO–phenyl(CF₃)–N–SCFCl₂] | 0 | 0 | |
| (XLIII₃) | [structure: Cl–phenyl with CO–NH–C₂H₅ and N–S–CFCl₂/CF₃] | 0 | 0 | |
| (XLIV₂) | [structure: Cl–phenyl with CONHC₃H₇-i and N–SCFCl₂/CF₃] | 0 | 0 | |
| (XLV₃) | [structure: i-C₃H₇NH–CO–phenyl(CF₃)–N–SCFCl₂] | 0 | 0 | |
| (XLVI₃) | [structure: phenyl with CONHC₃H₇-i and N–SCFCl₂/CF₃] | 0 | 0 | 2 |

[1] As a percentage of the infestation of the untreated control with a concentration of active compound.

TABLE 6A.—PHYSICAL PROPERTY DATA FOR COMPOUNDS XXXVII TO XLVIII

| Active compound No.: | Melting point (° C.) |
|---|---|
| (XXXVII) | (Oily) |
| (XXXVIII) | 148–150 |
| (XXXIX) | 135–138 |
| (XL) | 108 |
| (XLI) | 129 |
| (XLII) | 142–145 |
| (XLIII) | 129–130 |
| (XLIV) | 145–147 |
| (XLV) | 132–133 |
| (XLVI) | 152–154 |
| (XLVII) | 156–159 |
| (XLVIII) | (Oily) |

Advantageously, in accordance with the present invention, in the foregoing formulae:

$R_1$ represents trihalomethyl such as tri-chloro and fluoromethyl; tri-mixed chloro, bromo, fluoro and iodo-methyl including dichloro-mono-bromo, fluoro and iodo-methyl, difluoro-mono-chloro, bromo and iodo-methyl, dibrmo-mono-chloro, fluoro and iodo-methyl, etc.; chloro-bromo-fluoro-methyl; chloro-iodo-fluoro-methyl; and the like, especially trichloromethyl, dichloromonofluoromethyl and difluoromonochloromethyl;

$R_2$ represents halo such as chloro, bromo, iodo and fluoro, especially chloro, bromo and fluoro;

lower alkyl such as methyl, ethyl, n-propyl, isopropyl, n-butyl, isobutyl, sec.-butyl, tert.-butyl, and the like, especially alkyl having 1–4 or 1–3 or 1–2 carbon atoms;

lower alkoxy such as methoxy, ethoxy, n-propoxy, isopropoxy, n-butoxy, isobutoxy, sec.-butoxy, tert.-butoxy, and the like, especially alkoxy having 1–4 or 1–3 or 1–2 carbon atoms; and/or trifluoromethyl;

$R_3$ represents hydrogen;

lower alkyl such as methyl to tert.-butyl inclusive as defined above for $R_2$, especially alkyl having 1–4 or 1–3 or 1–2 carbon atoms; or lower alkenyl such as α-allyl (prop-2-enyl), β-allyl (isopropenyl or 1-methyl-vinyl), γ-allyl (prop-1-enyl), but-1-enyl, but-2-enyl (crotyl), but-3-enyl, isobutenyl (2-methyl-prop-1-enyl), methallyl (2-methyl-prop-2-enyl), and the like, especially alkenyl having 2–4 or 2–3 or 3–4 carbon atoms;

$R_4$ represents hydrogen;

alkyl such as methyl, ethyl, n-propyl, isopropyl, n-butyl, isobutyl, sec.-butyl, tert.-butyl, n-amyl, isoamyl, n-hexyl, isohexyl, n-heptyl, n-octyl, isooctyl, n-nonyl, n-decyl, n-undecyl, n-dodecyl, etc., and the like, especially alkyl having 1–12 carbon atoms, more especially lower alkyl, and particularly alkyl having 1-4 or 1-3 or 1-2 carbon atoms;

alkenyl such as allyl to methallyl inclusive as defined for R₃ above, and the like, especialy lower alkenyl, and particularly alkenyl having 2-4 or 2-3 or 3-4 carbon atoms;

cycloalkyl such as cyclo -pentyl, -hexyl, -heptyl, -octyl, and the like, especially cycloalkyl having 5-6 ring carbon atoms and particularly cyclopentyl and cyclohexyl; phenyl;

substituted phenyl which is mono, di, poly and mixed substituted with 1-3 of halo as defined for R₂ and especially chloro, bromo and/or fluoro; nitro; lower alkyl such as methyl to tert.-butyl inclusive as defined for R₂, especially alkyl having 1-4 carbon atoms and particularly alkyl having 1-3 or 1-2 carbon atoms; and/or lower alkoxy such as methoxy to tert.-butoxy inclusive as defined for R₂, especially alkoxy having 1-4 carbon atoms and particularly alkoxy having 1-3 or 1-2 carbon atoms; or hydroxy-lower alkyl such as hydroxy substituted methyl to tert.-butyl inclusive as defined above, and the like, especially hydroxy-$C_{1-4}$ or $C_{1-3}$ or $C_{1-2}$ alkyl, and more especially β-hydroxy-ethyl; and $n$ is a whole number from 0-3, and especially 0 or 1, such that when $n$ is 2 or 3 then the corresponding two of three R₂ radicals may be the same or different.

All of the particular new active compounds of Formula I above may be prepared in the manner described herein, and especially in accordance with the appropriate specific procedure of production Examples 8, 12 and 14.

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with respect to warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. (N - trihalomethylthio - N - trifluoromethylamino)- benzamide having the formula

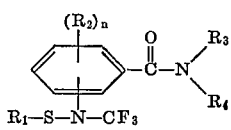

in which $n$ is a whole number from 0 to 1, R₁ is selected from the group consisting of trichloromethyl, trifluoromethyl, dichloromonofluoromethyl, difluoromonochloro methyl and bromochlorofluoromethyl, R₂ is selected from the group consisting of halo, lower alkyl having 1-4 carbon atoms, lower alkoxy having 1-4 carbon atoms and trifluoromethyl, R₃ is selected from the group consisting of hydrogen, lower alkyl having 1-4 carbon atoms and lower alkenyl having 2-4 carbon atoms, and R₄ is selected from the group consisting of hydrogen, alkyl having 1-12 carbon atoms, lower alkenyl having 2-4 carbon atoms, cycloalkyl having 5-6 ring carbon atoms, hydroxyloweralkyl having 1-4 carbon atoms, phenyl and substituted phenyl which is substituted with 1-3 substituents individually selected from the group consisting of halo, nitro, lower alkyl having 1-4 carbon atoms and lower alkoxy having 1-4 carbon atoms.

2. Benzamide according to claim 1 wherein $n$ is a whole number from 0 to 1, R₁ is selected from the group consisting of trichloromethyl, trifluoromethyl, dichloromonofluoromethyl, difluoromonochloromethyl and bromochlorofluoromethyl, R₂ is selected from the group consisting of halo, lower alkyl having 1-4 carbon atoms, lower alkoxy having 1-4 carbon atoms and trifluoromethyl, R₃ is selected from the group consisting of hydrogen, lower alkyl having 1-4 carbon atoms and lower alkenyl having 2-4 carbon atoms, and R₄ is selected from the group consisting of hydrogen, lower alkyl having 1-4 carbon atoms, lower alkenyl having 2-4 carbon atoms, cycloalkyl having 5-6 ring carbon atoms, hydroxyloweralkyl having 1-4 carbon atoms, phenyl and lower alkyl-phenyl having 1-4 carbon atoms in the lower alkyl moiety.

3. Benzamide according to claim 1 wherein $n$ is a whole number from 0 to 1, R₁ is selected from the group consisting of dichloromonofluoromethyl, trichloromethyl and bromochlorofluoromethyl, R₂ is selected from the group consisting of halo, lower alkyl having 1-3 carbon atoms, lower alkoxy having 1-2 carbon atoms and trifluoromethyl, R₃ is selected from the group consisting of hydrogen, lower alkyl having 1-4 carbon atoms and lower alkenyl having 2-4 carbon atoms, and R₄ is selected from the group consisting of hydrogen, lower alkyl having 1-4 carbon atoms, lower alkenyl having 2-4 carbon atoms, cyclohexyl, phenyl and para-lower alkyl-phenyl having 1-3 carbon atoms in the lower alkyl moiety.

4. Benzamide according to claim 1 wherein such compound is 2 - (N'-dichloromonofluoromethylthio-N'-trifluoromethyl-amino)-N-n-butyl - benzamide having the formula

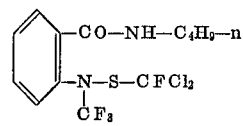

5. Benzamide according to claim 1 wherein such compound is 2-(N-dichloromonofluoromethylthio-N-trifluoromethyl-amino)-benzamide having the formula

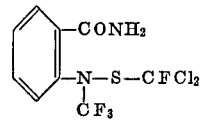

6. Benzamide according to claim 1 wherein such compound is 2 - (N'-dichloromonofluoromethylthio-N'-trifluoromethyl-amino)-N,N-dimethyl-benzamide having the formula

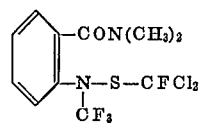

7. Benzamide according to claim 1 wherein such compound is 4 - (N'-dichloromonofluoromethylthio-N'-trifluoromethyl - amino)-3-methyl-N,N-dimethyl-benzamide having the formula

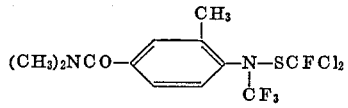

8. Benzamide according to claim 1 wherein such compounds is 3 - (N'-dichloromonofluoromethylthio-N'-trifluoromethyl - amino) - 4-methoxy-N-methyl-benzamide having the formula

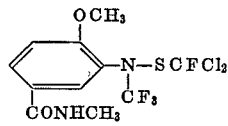

9. Benzamide according to claim 1 wherein such compound is 3 - (N'-dichloromonofluoromethylthio-N'-trifluoromethyl - amino)-4-chloro-N-methyl-benzamide having the formula

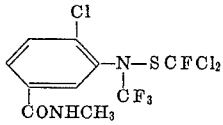

10. Benzamide according to claim 1 wherein such compound is 2 - (N'-dichloromonofluoromethylthio-N'-trifluoromethyl - amino)-5-trifluoromethyl-N-α-allyl-benzamide having the formula

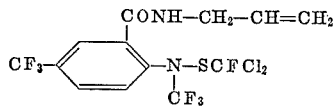

11. Benzamide according to claim 1 wherein such compound is 3 - (N'-dichloromonofluoromethylthio-N'-trifluoromethyl-amino)-benzamide having the formula

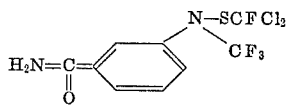

12. Benzamide according to claim 1 wherein such compound is 2 - (N'-dichloromonofluoromethylthio-N'-trifluoromethyl - amino)-4-chloro-N-ethyl-benzamide having the formula

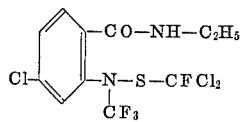

13. Benzamide according to claim 1 wherein such compound is 2 - (N'-dichloromonofluoromethylthio-N'-trifluoromethyl - amino)-4-chloro-N-isopropyl - benzamide having the formula

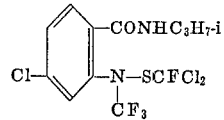

14. Benzamide according to claim 1 wherein such compound is 3 - (N'-dichloromonofluoromethylthio-N'-trifluoromethyl-amino)-N-isopropyl-benzamide having the formula

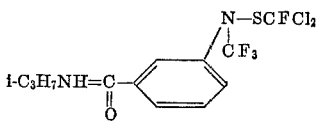

15. Benzamide according to claim 1 wherein such compound is 2-(N'-dichloromonofluoromethylthio-N'-trifluoromethyl-amino)-N-isopropyl-benzamide having the formula

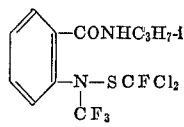

References Cited

Bessey: Morphology and Taxonomy of Fungi (1950), p. 298 (Blakiston Co., Phila.).

HENRY R. JILES, Primary Examiner

H. I. MOATZ, Assistant Examiner

U.S. Cl. X.R.

260—559(T), 544(F), 326(H); 124—324

UNITED STATES PATENT OFFICE
CERTIFICATE OF CORRECTION

Patent No. 3,597,480            Dated August 3, 1971

Inventor(s) Hans Scheinpflug et al

It is certified that error appears in the above-identified patent and that said Letters Patent are hereby corrected as shown below:

Col. 29, line 25

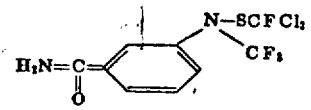 should be 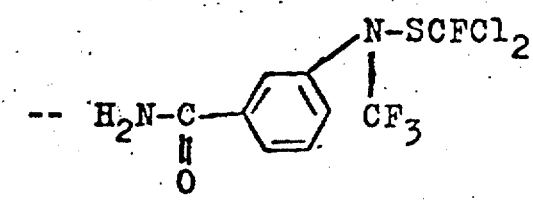

Col. 30, line 15

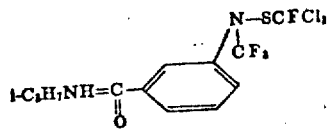 should be 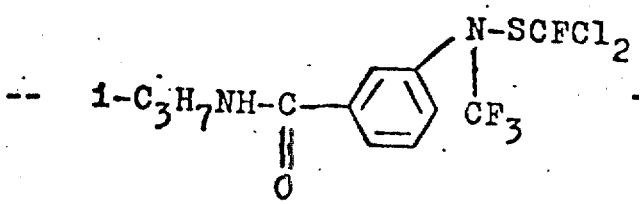

Signed and sealed this 22nd day of August 1972.

(SEAL)
Attest:

EDWARD M. FLETCHER, JR.
Attesting Officer

ROBERT GOTTSCHALK
Commissioner of Patents